Patented Nov. 5, 1929

1,734,269

UNITED STATES PATENT OFFICE

OSKAR NEUBERT, OF LEVERKUSEN, GERMANY, ASSIGNOR TO WINTHROP CHEMICAL COMPANY, INC., OF NEW YORK, N. Y., A CORPORATION OF NEW YORK

WATER-SOLUBLE SUBSTANCE CONTAINING COLLOIDAL SILVER CHLORIDE

No Drawing. Application filed July 30, 1928, Serial No. 296,419, and in Germany August 9, 1927.

The present invention concerns water soluble substances containing colloidal silver chloride and a process of preparing same.

In accordance with the present invention water soluble solid and very stable substances containing colloidal silver chloride, are obtainable by passing a current of chlorine through an aqueous solution of a silver albumen compound, advantageously until the solution will be saturated with chlorine, while maintaining the solution neutral in a suitable manner, for instance by the constant addition of small quantities of sodium carbonate, ammonia caustic soda solution, or the like. The resulting solution is then dialyzed with water and carefully reduced to dryness. The brownish powders thus obtainable dissolve very readily in water with a neutral reaction. The aqueous solutions which are extraordinary stable, appear, in thin layers brilliant clear brown in transmitted light and grey opalescent in reflected light. Mineral acids precipitate the silver chloride albumen compounds. These precipitates, however, readily redissolve with a little alkali, giving the original neutral liquid. Sodium chloride and sodium hydroxide do not cause precipitation.

The products are intended to be used for pharmaceutical purposes.

The following example will illustrate my invention without limiting it thereto:—

*Example.*—10 parts by weight of a silver protein compound (see German Patent No. 105,866) are dissolved in 200 parts of water. Chlorine is led slowly into this solution at the ordinary temperature for about 1 hour while stirring, the solution being maintained neutral by the addition of small quantities of dilute caustic soda solution. The resulting solution is then dialyzed with water until the latter no longer gives the chlorine reaction with silver nitrate, and finally evaporated to dryness by distillation in vacuo at a temperature below about 40° C.

The brownish powder thus obtained exhibits the properties above indicated. It contains about 7.5% of silver and about 2.5% of chlorine. The yield amounts to about 10 parts by weight.

I claim:—

1. In the process of manufacturing a water soluble substance containing colloidal silver chloride the step which comprises, dissolving a silver albumen compound in water and leading chlorine through this solution.

2. In the process of manufacturing a water soluble substance containing colloidal silver chloride the step which comprises, dissolving a silver albumen compound in water and leading chlorine through this solution until the solution will be saturated with chlorine.

3. The process which comprises dissolving a silver albumen compound in water, leading a current of chlorine through the solution while maintaining it neutral dialyzing with water the solution thus obtained, and carefully evaporating the dialyzed solution to dryness.

4. Process which comprises dissolving 10 parts by weight of a silver albumen compound in 200 parts by weight of water leading chlorine through this solution for about 1 hour while maintaining it neutral by the addition of diluted caustic soda solution, dialyzing the solution thus obtained with water and finally evaporating it to dryness by distillation in vacuo at a temperature below about 40° C.

5. The new products being obtainable according to the process claimed in claim 3 said products, which contain silver chloride, being brownish powders yielding with water neutral and very stable solutions which appear in a thin layer brilliant clear brown in transmitted light and grey opalescent by reflected light.

6. The new product obtainable according to the process claimed in claim 4, said product which contains about 7.5% of silver, 2.5% of chlorine being a brownish powder yielding with water a neutral and very stable solution which appears in a thin layer brilliant clear brown in transmitted light and grey opalescent by reflected light.

In testimony whereof I have hereunto set my hand.

OSKAR NEUBERT. [L. S.]